United States Patent
Zaloga

[19]

[11] Patent Number: 5,983,556
[45] Date of Patent: Nov. 16, 1999

[54] ACCESSIBLE FISH LURE HOLDER

[76] Inventor: Peter P. Zaloga, 129 S. Braintree, Schaumburg, Ill. 60193

[21] Appl. No.: 09/128,815

[22] Filed: Aug. 4, 1998

[51] Int. Cl.⁶ .............................. A01K 97/06; A47H 1/02
[52] U.S. Cl. ........................................... 43/57.1; 211/105.1
[58] Field of Search ........................ 43/57.1; 211/105.1, 211/105.2, 123; 248/205.5, 206.3

[56] References Cited

U.S. PATENT DOCUMENTS

| | | | |
|---|---|---|---|
| 3,155,238 | 11/1964 | Bennett | 211/105.1 |
| 3,736,668 | 6/1973 | Dillarstone | 211/105.1 |
| 4,186,511 | 2/1980 | Slacter | 43/57.1 |
| 4,328,761 | 5/1982 | Dwyer | 114/222 |
| 4,472,640 | 9/1984 | Elmer | 307/35 |
| 4,742,640 | 5/1988 | Moore | 43/57.1 |
| 5,137,158 | 8/1992 | Brockway | 211/105.1 |
| 5,182,878 | 2/1993 | Clark | 43/57.1 |
| 5,217,123 | 6/1993 | Riley et al. | 211/105.1 |
| 5,295,595 | 3/1994 | Gobidas et al. | 211/105.1 |
| 5,495,884 | 3/1996 | Shiker | 211/105.1 |
| 5,651,520 | 7/1997 | Belokin et al. | 248/205.9 |
| 5,657,573 | 8/1997 | Fischer et al. | 43/57.1 |

OTHER PUBLICATIONS

Popular Mechanics, "Fishing Lure Holder for Boat Hooks Over Gunwale", p. 176, Sep. 1948.

*Primary Examiner*—Michael J. Carone
*Assistant Examiner*—Fredrick T. French, III
*Attorney, Agent, or Firm*—Dillis V. Allen, Esq.

[57] ABSTRACT

An accessible fish lure holder releasably attachable to a boat's gunnel by suction cups. An elongated horizontal bar is supported on the suction cups that curves a cylindrical foam sleeve into which the fisherman drives the lure hooks. The foam holds the hooks securely but permits their easy removal when the fisherman wants to fish with. The suction cups also act as shock absorbers for the bar and foam sleeve to minimize inadvertent lure drop-off and the foam is rotatable on the bar to turn a fresh undamaged part of the foam upwardly after the upper part of the foam becomes torn with use.

12 Claims, 2 Drawing Sheets

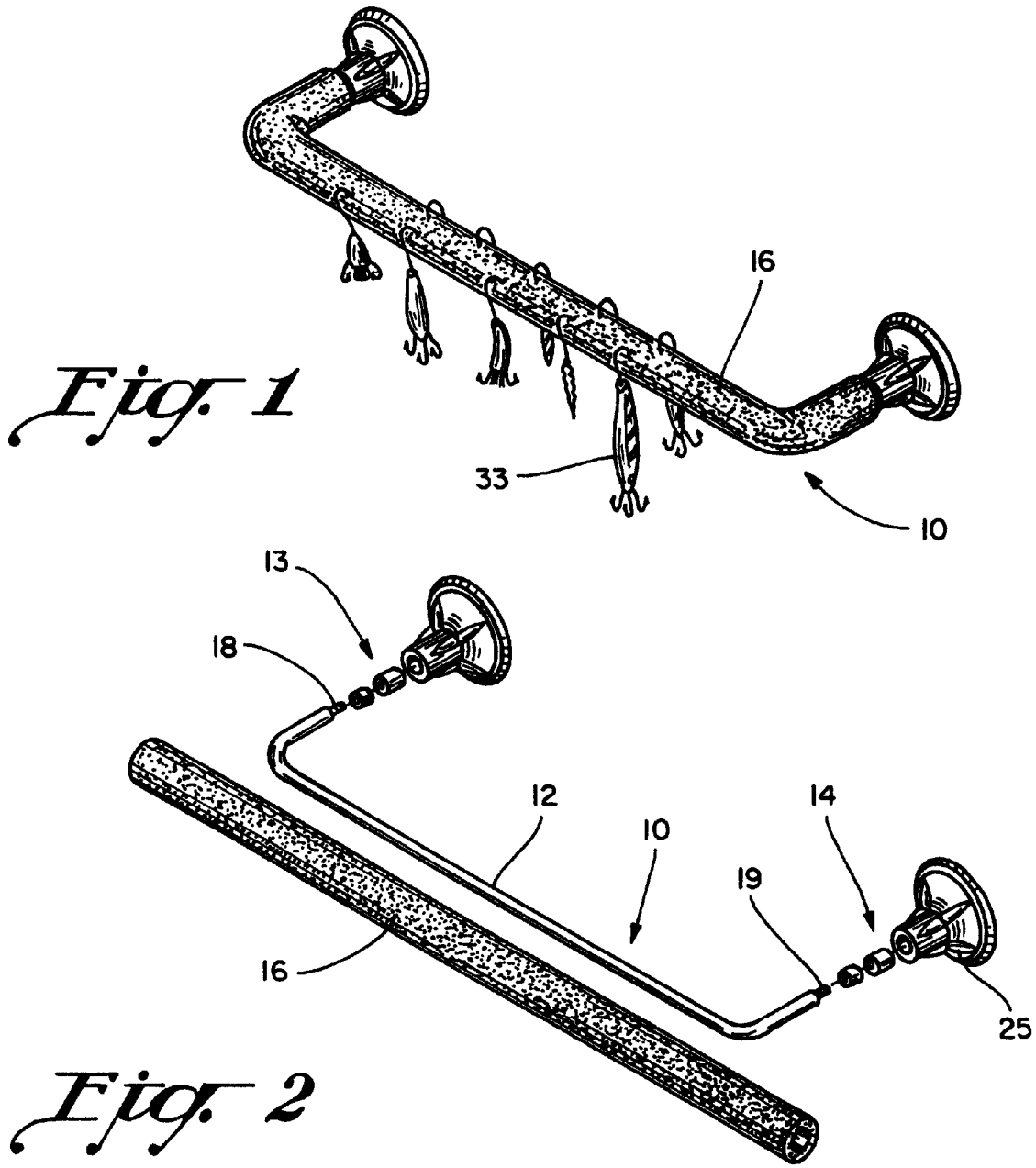
Fig. 1
Fig. 2
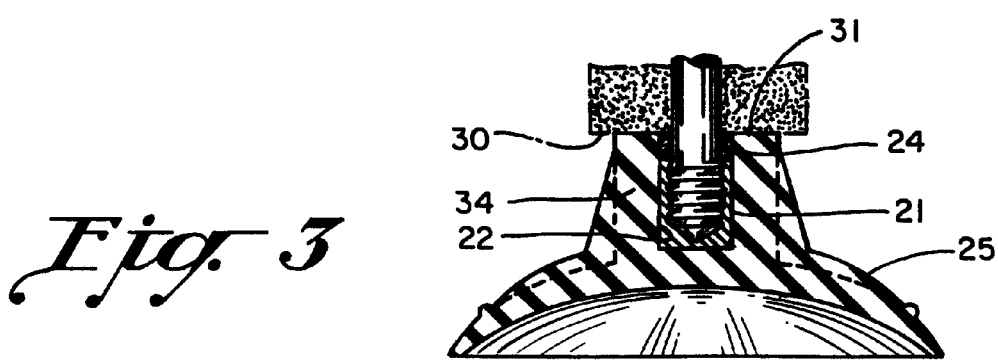
Fig. 3

ACCESSIBLE FISH LURE HOLDER

BACKGROUND OF THE PRESENT INVENTION

In-boat display-type fish lure holders have become popular over about the last decade because tackle boxes do not permit the ready retrieval of fishing lures by the fisherman. That is, if the fisherman uses a conventional tackle box to display his or her lures in the boat, one lure frequently hides the lure the fisherman desires and the fisherman frequently fumbles around attempting to retrieve the desired lure. Also, if the boat is moving, the bouncing motion frequently impacts the tackle box causing the lures to bounce out of the tackle box.

In an effort to solve these tackle box problems, there have been provided in the past a plurality of devices that permit the display of multiple lures inside the boat and enable the fisherman to see at least some of his lures outside the tackle box and permit the lures to be selected as desired during the fisherman's day.

One such device is shown and described in the Slacter, U.S. Pat. No. 4,186,511. This device includes a flat elastomeric panel with top clips that hook over the boat gunnel. This device is effective in displaying the lures to the fisherman, but because the panel is flat, it is difficult for the fisherman to rotate the hook when removing the lure from the panel because it is flat. Also, the clips that go over the gunnel, identified at 38 and 40 in the patent, permit the elastomeric panel to flop around on the side of the boat, and in some cases if the ride gets bouncy, the clips, because they are non-positive securing means, permit the panel to bounce off the boat gunnel.

Another patent that permits the display of lures to the fisherman, is shown and described in the Moore, U.S. Pat. No. 4,742,640., This device is a channel-shaped sheet metal member that has a square piece of foam in its channel. It is screwed to the boat and, therefore, is undesirable because it would damage the boat's surface. But over and above that, the fact that only the top surface of the foam is accessible for impaling fish hooks, it is really only useable with larger hooks. Furthermore, the foam is not glued in the channel, and hence, when the fisherman attempts to pull the hook upwardly, the foam in the channel starts to come out of the channel.

Finally, the Clark, U.S. Pat. No. 5,182,878, discloses a fish hook holder that is a rigid end capped tube 1 having a line of holes 3 on its top surface. This design has the disadvantage, as seen in FIG. 3, that it cannot hold small hooks. Furthermore, the single line of holes limits the number of lures that can be held by this tubular design.

An additional disadvantage in all of the above three discussed lure holders is that the lure holder itself is limited in the number of lures that can be held.

It is a primary object of the present invention to provide a more accessible lure holder and one that ameliorates the problems noted above in prior art lure holders.

SUMMARY OF THE PRESENT INVENTION

It is a primary object of the present invention to provide a lure holder that is more accessible than prior art lure holders, holds more lures than earlier designs, and minimizes inadvertent lure drop-off.

Toward these ends, the present accessible lure holder is releasably attachable to the boat gunnel by rubberized suction cups. An elongated rigid horizontal bar is supported on the suction cups, and it carries a cylindrical foam sleeve into which the fisherman drives or impales the lure hooks. Because the foam is cylindrical, it enables the fisherman to drive the hooks in the top of the sleeve, on the sides of the sleeve, and even on the bottom of the sleeve, and this permits any sized hook without limitation to be held on the present lure holder. Also, the foam sleeve holds the hooks securely but permits their easy removal when the fisherman wants to use one. The suction cups also act as shock absorbers for the bar and foam sleeve, and thereby minimize the problem of the lures inadvertently dropping off the holder.

The foam sleeve is also rotatable on the bar and permits the fisherman to turn a fresh part of the foam upwardly after the upper part becomes torn up by fish hooks after extensive use.

In one embodiment of the present lure holder, the elongated bar is U-shaped in configuration, as is the foam sleeve. At least one of the suction cups is removable from the bar in this design that permits the foam sleeve to be slid off the bar and replaced when it becomes too damaged.

In another embodiment of the present invention, the elongated bar is straight and is supported at its ends by a pair of removable stanchions that are also connected to a pair of suction cups that attach to the boat's gunnel.

The suction cups enable the fisherman to readily move the lure holder to different positions around the boat as the fishing day progresses.

It should be understood that other means may be provided to attach the lure holder to the boat such as adhesive coated pads, filament hook fasteners, and other types of releasable fasteners.

Other objects and advantages of the present invention will appear more clearly from the following detailed description.

BRIEF DESCRIPTION OF THE DRAWINGS

FIG. 1 is a perspective view of a lure holder according to one embodiment of the present invention;

FIG. 2 is an exploded perspective view of the lure holder illustrated in FIG. 1 with the foam sleeve shown in its relaxed position;

FIG. 3 is a fragmentary enlarged section through one of the suction cups illustrated in FIGS. 1 and 2;

DETAILED DESCRIPTION OF THE PREFERRED EMBODIMENTS

Figure 4:
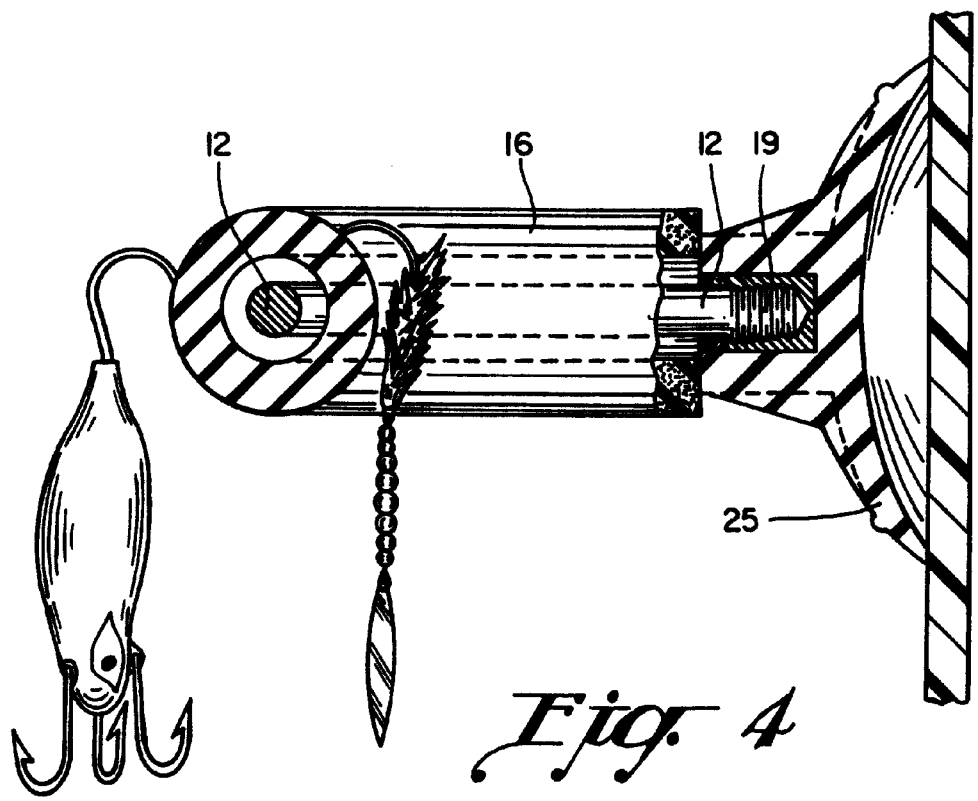
FIG. 4 is a double-plane cross section of the embodiment illustrated in FIGS. 1 to 3.

Referring to the drawings and particularly FIGS. 1 to 4, a fishing lure holder 10 is illustrated consisting generally of an elongated rigid U-shaped rod 12, releasably supported on a boat gunnel by identical suction cup assemblies 13 and 14, and a foam sleeve 16. The rod 12 may be either metallic or plastic and has threaded ends 18 and 19 that are received in a threaded insert 21 in suction cup bore 22, both forming part of the suction cup assemblies 13 and 14. As seen in FIGS. 2 and 3, a bushing 24 is seated in the top of bore 22 and engages the top of the threaded insert 21.

This assembly permits unthreading at one or both of the suction cups 25 from the ends of the rod 12 permitting the foam sleeve 16 to be removed and replaced after it becomes excessively damaged.

The suction cups 25 are a low Shore A durometer synthetic elastomer or rubber neoprene.

As seen in FIGS. 1 and 3, the foam sleeve 16 has a sufficient length so its ends 30 engage flat tops 31 of the suction cup so that the sleeve 16 does not slide back and forth on the rod 12. Sleeve 16 can be constructed of an open or closed cell foam and may be either extruded in shape or may be formed flat and then seamed.

Because the sleeve 16 is cylindrical, the lures 33 illustrated in FIG. 1 can have their hooks impaled on the sleeve in almost any angular orientation, or any circumferential position on the sleeve. This not only augments the number of lures that can be held in the lure holder 10, but also increases the hook sizes(most notable the smaller sizes) that can be accommodated noting that prior lure holders have difficulty in holding smaller hooks.

A further benefit in the present lure holder is that the sleeve 16 can be rotated on the rod 12 so that when the upper part of the sleeve, which is the primary, although not sole location for fish hooks, becomes excessively damaged, a fresh surface of the sleeve can be rotated upwardly. In this regard, because the sleeve conforms to the U-shaped configuration of the bar 12, the distortion of the sleeve 16 by the rod creates friction that holds the sleeve in a position rotated by the fisherman, even though the sleeve has an inner diameter greater than the outer diameter of the rod 12 as seen in FIG. 4.

The suction cups 25 have an internal stand-off boss portion 34 that acts as a shock absorber for the rod 12 and the sleeve 16, and this feature minimizes the inadvertent lure drop-off usually carried by boat motion.

Figure 5:
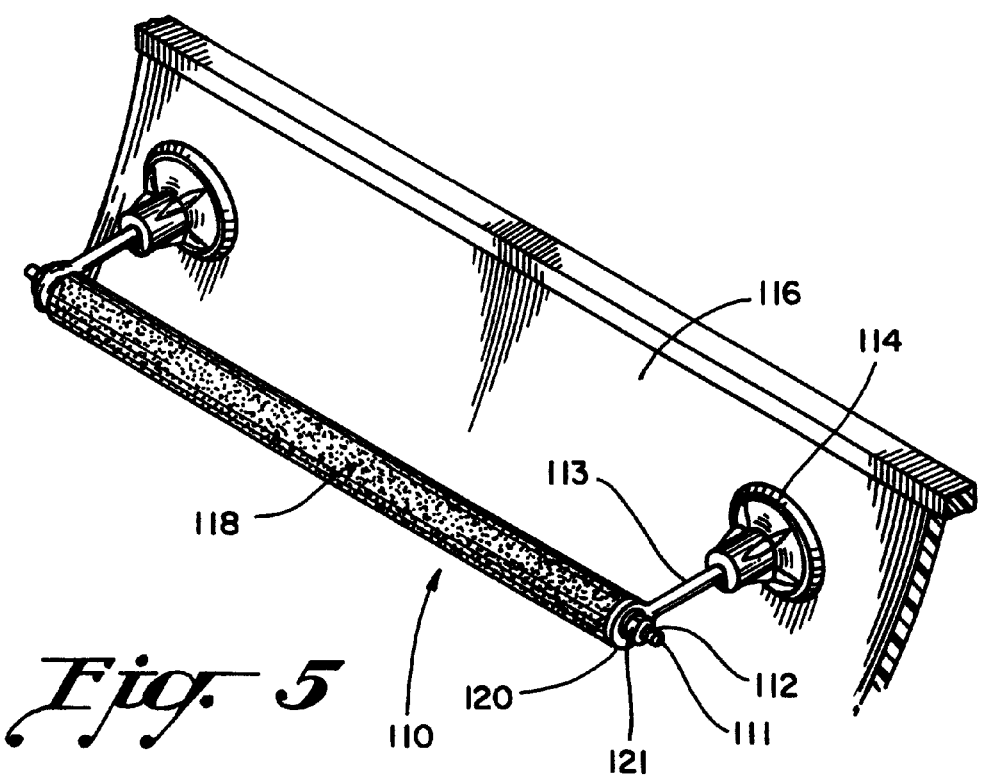
FIG. 5 is a perspective view of a second embodiment of the present lure holder shown attached to a fragmented boat gunnel.

A second embodiment of the present lure holder is illustrated in FIG. 5, and is generally designated by the reference numeral 110. Holder 110 functions in the same manner and has most of the advantages shown and described above with respect to the preferred embodiment 10. Holder 110 includes a straight rod 111 having threaded ends 112 that receive eyes on a pair of identical stanchions 113, each of which carries a suction cup 114 at its ends releasably attachable to boat gunnel 116 shown only in fragmented form in FIG. 5. The rod 111 carries a cylindrical foam sleeve 118 that functions in the same manner as the sleeve 16 in the FIGS. 1 to 4 embodiment. The rod 111 is held in position in stanchion eyes 120 by threaded nuts 121 that are removable to permit the removal of the rod 111 and the replacement of the sleeve 118 when necessary. The foam sleeve 118 is rotatable on rod 111, but requires a tighter fit on rod 111 (compared to sleeve 16) to prevent inadvertent rotation of the sleeve 118 on rod 111.

What is claimed is:

1. An accessible fish lure holder, comprising: an elongated member, means for releasably supporting the elongated member in a boat, means for releasably supporting hooks on the elongated member including an elongated cylindrical synthetic foam member surrounding the elongated member whereby fish hooks can be implanted into the foam member in a variety of circumferential positions thereon, and means for rotating the foam member on the elongated member and holding the foam member in a rotated position to expose a fresh surface after foam member damage by hook impaling including a passage in the foam member receiving the elongated member, said passage being substantially larger than the elongated member to permit rotation of the foam member, and means on the elongated member engageable with the foam member to frictionally hold the foam member in a rotationally adjusted position.

2. An accessible fish lure holder as defined in claim 1, wherein the means for releasably supporting the elongated member in a boat includes a pair of suction cups at the ends of the elongated member.

3. An accessible fish lure holder as defined in claim 2, wherein the suction cups are removable to permit replacement of the foam member.

4. An accessible fish lure holder as defined in claim 1, wherein the means for releasably supporting the elongated member in a boat includes shock absorber means at both ends of the elongated member to minimize inadvertent fish lure dropping off the foam member.

5. An accessible fish lure holder as defined in claim 1, wherein the elongated member is rigid.

6. An accessible fish lure holder as defined in claim 1, wherein the elongated member is "U" shaped.

7. An accessible fish lure holder as defined in claim 1, wherein the elongated member is straight, said means for supporting the elongated member includes a pair of removable stanchions at the ends of the elongated member that permit the removal and replacement of the foam member.

8. An accessible fish lure holder, comprising: an elongated member, means for releasably supporting the elongated member in a boat, means for releasably supporting hooks on the elongated member including an elongated elastomeric member around the elongated member, said means for releasably supporting the elongated member in a boat includes shock absorber means at both ends of the elongated member to minimize inadvertent fish lure dropping off the foam member, and means for rotating the elastomeric member on the elongated member and holding the elastomeric member in a rotated position to expose a fresh surface after elastomeric member damage by hook impaling including a passage in the elastomeric member receiving the elongated member, said passage being substantially larger than the elongated member to permit rotation of the elastomeric member, and means on the elongated member engageable with the elastomeric member to frictionally hold the elastomeric member in a rotationally adjusted position.

9. An accessible fish lure holder as defined in claim 9, wherein the elongated member is rigid.

10. An accessible fish lure holder as defined in claim 9, wherein the elongated member is "U" shaped.

11. An accessible fish lure holder as defined in claim 9, wherein the elongated member is straight, said means for supporting the elongated member includes a pair of removable stanchions at the ends of the elongated member that permit the removal and replacement of the foam member.

12. An accessible fish lure holder, comprising: an elongated member, means for releasably supporting the elongated member in a boat, means for releasably supporting hooks on the elongated member including an elongated elastomeric member around the elongated member, said means for releasably supporting the elongated member in a boat including a pair of suction cups at the ends of the elongated member, said suction cups being removable to permit replacement of the foam member, and means for rotating the elastomeric member on the elongated member and holding the elastomeric member in a rotated position to expose a fresh surface after elastomeric member damage by hook impaling including a passage in the elastomeric member receiving the elongated member, said passage being substantially larger than the elongated member to permit rotation of the elastomeric member, and means on the elongated member engageable with the elastomeric member to frictionally hold the elastomeric member in a rotationally adjusted position.

* * * * *